(12) United States Patent
Orita et al.

(10) Patent No.: US 11,184,496 B2
(45) Date of Patent: Nov. 23, 2021

(54) IMAGE READING APPARATUS

(71) Applicant: PFU Limited, Ishikawa (JP)

(72) Inventors: Shinya Orita, Ishikawa (JP); Masaya Takamori, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 0 days.

(21) Appl. No.: 17/157,741

(22) Filed: Jan. 25, 2021

(65) Prior Publication Data

US 2021/0144263 A1    May 13, 2021

Related U.S. Application Data

(63) Continuation of application No. PCT/JP2018/028305, filed on Jul. 27, 2018.

(51) Int. Cl.
*H04N 1/00* (2006.01)

(52) U.S. Cl.
CPC ....... *H04N 1/0066* (2013.01); *H04N 1/00795* (2013.01); *H04N 1/00827* (2013.01)

(58) Field of Classification Search
CPC ...... G06K 9/00; H04N 1/0066; H04N 1/0079; H04N 1/00795; H04N 1/0082; H04N 5/225; H04N 5/2254; H04N 5/232; H04N 1/00602; H04N 1/00615; H04N 1/00827; H04N 1/0083; H04N 1/04; H04N 1/10; H04N 1/1017; H04N 5/23287
USPC .................................................. 358/471, 482
See application file for complete search history.

(56) References Cited

U.S. PATENT DOCUMENTS

| | | | |
|---|---|---|---|
| 2008/0203649 A1* | 8/2008 | Watase | B65H 5/062 271/9.13 |
| 2008/0211171 A1* | 9/2008 | Kusumi | B65H 5/062 271/225 |
| 2009/0153674 A1 | 6/2009 | Takabatake et al. | |
| 2010/0182628 A1 | 7/2010 | Ino | |

(Continued)

FOREIGN PATENT DOCUMENTS

| | | |
|---|---|---|
| JP | S59-169158 U | 11/1984 |
| JP | 2000-358184 A | 12/2000 |

(Continued)

OTHER PUBLICATIONS

International SearchReport issued in corresponding International Patent Application No. PCT/JP2018/028305, dated Oct. 30, 2018, with English translation.

*Primary Examiner* — Negussie Worku
(74) *Attorney, Agent, or Firm* — McDermott Will & Emery LLP

(57) ABSTRACT

An image reading apparatus includes a first holding member that is provided with a first holding surface opposed to a placement surface, a second holding member that is provided with a second holding surface opposed to the placement surface, a guide member that is disposed on a front side of the first holding member and the second holding member, and an imaging unit that capture a medium placed on the placement surface, wherein the guide member is provided with a guide surface coupled to the first holding surface and the second holding surface and is disposed such that a distance from the placement surface to a first portion of the guide surface is smaller than a distance from the placement surface to a second portion of the guide surface disposed closer to the front side than the first portion.

8 Claims, 14 Drawing Sheets

(56) References Cited

U.S. PATENT DOCUMENTS

| | | | |
|---|---|---|---|
| 2017/0331970 A1* | 11/2017 | Osanai | H04N 1/1008 |
| 2018/0288235 A1* | 10/2018 | Kawatsu | H04N 1/00013 |
| 2019/0166278 A1 | 5/2019 | Hiyama et al. | |
| 2019/0174021 A1* | 6/2019 | Hiyama | H04N 1/02835 |

FOREIGN PATENT DOCUMENTS

| | | |
|---|---|---|
| JP | 2001-134747 A | 5/2001 |
| JP | 2002-68534 A | 3/2002 |
| JP | 2009-147842 A | 7/2009 |
| JP | 2010-171570 A | 8/2010 |
| JP | 2010-219852 A | 9/2010 |
| JP | 2017-092928 A | 5/2017 |
| JP | 2018-26805 A | 2/2018 |

\* cited by examiner

IMAGE READING APPARATUS

CROSS-REFERENCE TO RELATED APPLICATION

This application is a continuation of International Application No. PCT/JP2018/028305, filed on Jul. 27, 2018, the entire contents of which are incorporated herein by reference.

FIELD

The technology in the present disclosure is related to an image reading apparatus.

BACKGROUND

In hotels or retail stores, the reading of the passport of a person from overseas has been widely performed. There is a known image reading apparatus that appropriately reads a booklet such as a passport (refer to Japanese Laid-open Patent Publication No. 2009-147842 and Japanese Laid-open Patent Publication No. 2017-92928).

Unfortunately, this type of image reading apparatus has a problem of the inconvenient operation of placing a page of the booklet to be captured at a predetermined position or correcting the page to be captured so as to be flat.

SUMMARY

According to an aspect of an embodiment, an image reading apparatus includes a first holding member that is provided with a first holding surface opposed to a placement surface, a second holding member that is provided with a second holding surface opposed to the placement surface, a guide member that is disposed on a front side of the first holding member and the second holding member, and an imaging unit that is disposed so as to be opposed to the placement surface and capture a medium placed on the placement surface. The guide member is provided with a guide surface coupled to the first holding surface and the second holding surface and is disposed such that a distance from the placement surface to a first portion of the guide surface is smaller than a distance from the placement surface to a second portion of the guide surface disposed closer to the front side than the first portion.

The object and advantages of the disclosure will be realized and attained by means of the elements and combinations particularly pointed out in the claims.

It is to be understood that both the foregoing general description and the following detailed description are exemplary and explanatory and are not restrictive of the disclosure.

DESCRIPTION OF EMBODIMENTS

Figure 1:
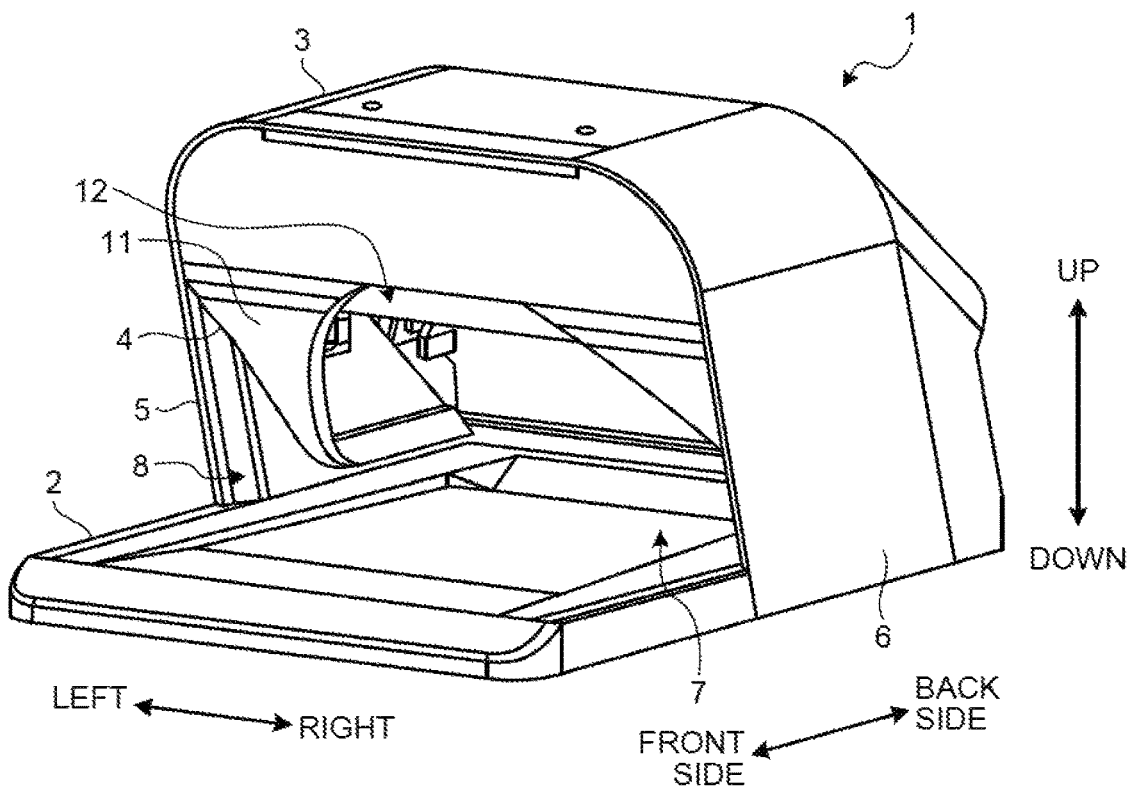
FIG. 1 is a perspective view illustrating an image reading apparatus according to a first embodiment.

Preferred embodiments of the disclosure will be explained with reference to accompanying drawings. An image reading apparatus according to an embodiment disclosed in the subject application is described below with reference to the drawings. Note that the technology in the present disclosure is not limited to the description below. Furthermore, in the description below, the same components are denoted by the same reference numeral, and redundant descriptions are omitted.

First Embodiment

FIG. 1 is a perspective view illustrating an image reading apparatus 1 according to a first embodiment. The image reading apparatus 1 includes a bottom member 2, a chassis 3, and a guide member 4. The bottom member 2 is formed in substantially a plate shape and is placed on an installation surface where the image reading apparatus 1 is installed. The chassis 3 is made of a material that is unlikely to pass light and is formed in a box shape. The chassis 3 includes a left side wall 5 and a right side wall 6. The left side wall 5 is formed in substantially a plate shape to form an outer case of the chassis 3 on the left side with respect to a right-and-left direction. The right side wall 6 is formed in substantially a plate shape. The right side wall 6 is disposed along a plane parallel to another plane along the left side wall 5 to form an outer case of the chassis 3 on the right side with respect to the right-and-left direction. A lower opening 7 and a front opening 8 are formed in the chassis 3. The lower opening 7 is formed between the left side wall 5 and the right side wall 6 and is formed in an area of the chassis 3 on the lower side with respect to a vertical direction. The front opening 8 is formed between the left side wall 5 and the right side wall 6 and is formed in an area of the chassis 3 on the front side with respect to a medium insertion direction. The chassis 3 is disposed on the upper side of the bottom member 2 with respect to the vertical direction and is secured to the bottom member 2 such that the lower opening 7 is blocked by part of the bottom member 2 on the back side with respect to the medium insertion direction.

The guide member 4 is formed in substantially a flat plate shape to form a guide surface 11 and an opening 12. The guide member 4 is disposed inside the chassis 3 such that the guide surface 11 is exposed through the front opening 8. The guide member 4 is secured to the chassis 3. Part of the opening 12 is exposed such that part of the portion of the bottom member 2 covered by the chassis 3 is visible through the front opening 8.

Figure 2:
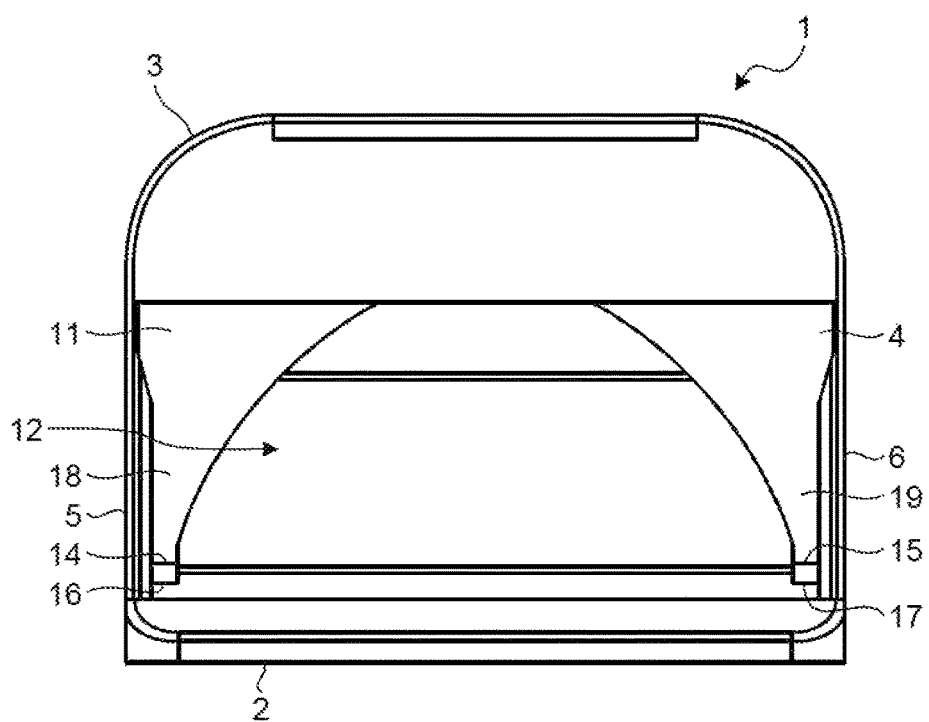
FIG. 2 is a front view illustrating the image reading apparatus according to the first embodiment.

FIG. 2 is a front view illustrating the image reading apparatus 1 according to the first embodiment. The image reading apparatus 1 further includes a left holding member 14 and a right holding member 15. The left holding member 14 is formed in a band shape to form a left holding surface 16. The left holding member 14 is disposed in a left area inside the chassis 3 such that the left holding member 14 extends along the plane parallel to the plane along the bottom member 2 and the left holding surface 16 is opposed to the bottom member 2. The left holding member 14 is secured to the left side wall 5 of the chassis 3. In the same manner as the left holding member 14, the right holding member 15 is formed in a band shape to form a right holding surface 17. The right holding member 15 is disposed in a right area inside the chassis 3 such that the right holding member 15 extends along the plane along the left holding member 14 and the right holding surface 17 is opposed to the bottom member 2. The right holding member 15 is secured to the right side wall 6 of the chassis 3.

The left holding member 14 and the right holding member 15 are disposed such that the width of the gap formed between the left holding member 14 and the right holding member 15 is shorter than a predetermined length. The predetermined length is, for example, the width of a passport and is, for example, 125 mm. The guide surface 11 includes a guide surface left portion 18 coupled to the left holding surface 16 and a guide surface right portion 19 coupled to the right holding surface 17. The opening 12 is formed between the guide surface left portion 18 and the guide surface right portion 19, and the edge is formed so as to extend along the circular arc. Further, the guide member 4 is formed such that the diameter of the opening 12 is shorter than the predetermined length.

Figure 3:
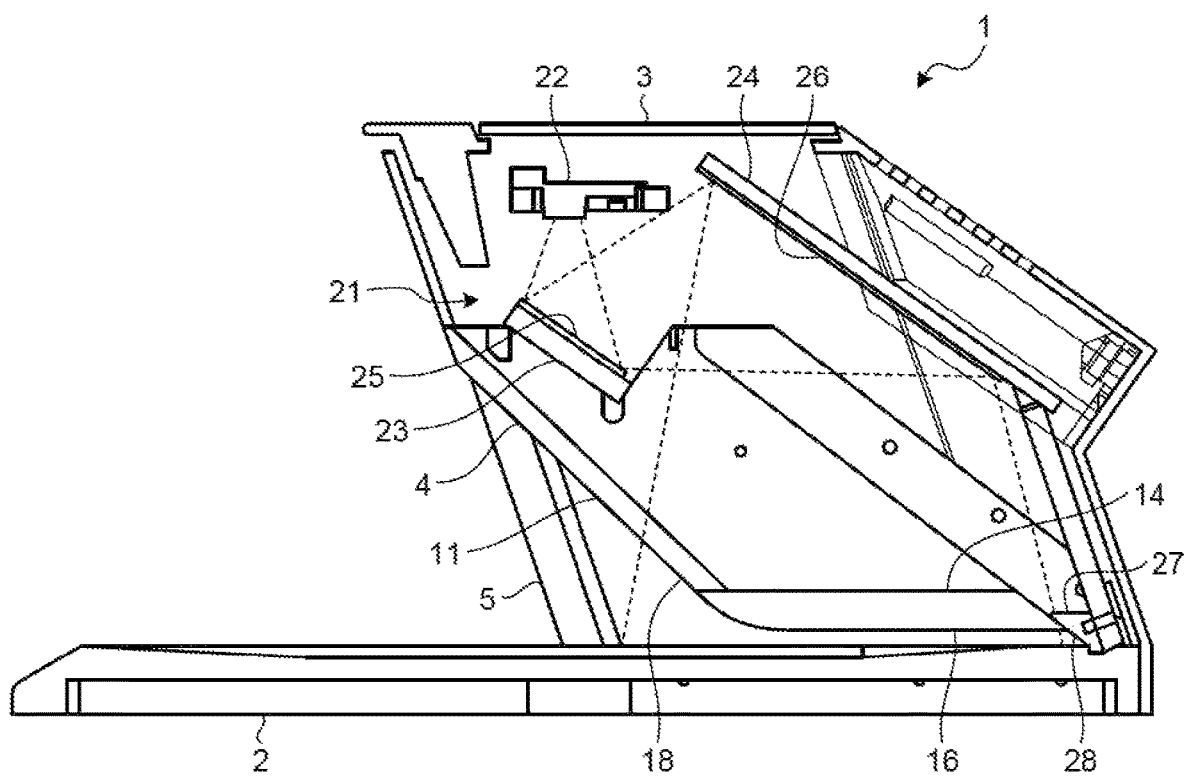
FIG. 3 is a cross-sectional view illustrating the image reading apparatus according to the first embodiment.

FIG. 3 is a cross-sectional view illustrating the image reading apparatus 1 according to the first embodiment. The guide member 4 is disposed on the front side of the left holding member 14 and the right holding member 15. The guide member 4 is provided such that the distance from the bottom member 2 to a given first portion of the guide surface 11 is smaller than the distance from the bottom member 2 to a second portion of the guide surface 11 that is located closer to the front side than the first portion. For example, the guide member 4 is provided such that the shortest distance from the bottom member 2 to the end of the guide surface 11 on the back side is smaller than the shortest distance from the bottom member 2 to the end of the guide surface 11 on the front side. That is, the guide member 4 is provided such that the guide surface 11 faces obliquely downward and is provided such that the space between the guide surface 11 and the bottom member 2 becomes smaller toward the back side. In the guide member 4, further, the back end of the portion of the guide member 4 in which the guide surface left portion 18 is formed is joined to the front end of the left holding surface 16 so that the guide surface left portion 18 of the guide surface 11 is coupled to the left holding surface 16. Similarly, in the guide member 4, the back end of the portion of the guide member 4 in which the guide surface right portion 19 is formed is joined to the front end of the right holding surface 17 such that the guide surface right portion 19 of the guide surface 11 is coupled to the right holding surface 17.

The image reading apparatus 1 further includes a booklet contact member 27. The booklet contact member 27 is formed in a rod shape and is provided with a booklet contact surface 28. The booklet contact surface 28 is formed to be substantially flat. The booklet contact member 27 is disposed in an area on the back side inside the chassis 3 by the left holding member 14 and the right holding member 15 and is secured to the chassis 3 so as to extend along the straight line perpendicular to the plane along the left side wall 5 or the right side wall 6. Further, the booklet contact member 27 is disposed such that the booklet contact surface 28 faces substantially the front side and the booklet contact surface 28 faces obliquely downward. Specifically, it is formed such that the distance from the bottom member 2 to any back contact surface portion of the booklet contact surface 28 is smaller than the distance from the bottom member 2 to a front contact surface portion of the booklet contact surface 28 located closer to the front side than the back contact surface portion. For example, the booklet contact surface 28 is formed such that the distance from the bottom member 2 to the end of the booklet contact surface 28 on the back side is smaller than the distance from the bottom member 2 to the end of the booklet contact surface 28 on the front side. That is, the booklet contact member 27 is disposed such that the upper end of the booklet contact surface 28 is located closer to the front side than the lower end of the booklet contact surface 28 and the space between the booklet contact surface 28 and the bottom member 2 becomes smaller toward the back side.

The image reading apparatus 1 further includes an imaging unit 21. The imaging unit 21 is disposed in an upper area within the chassis 3 and is secured to the chassis 3 so as to be opposed to the portion of the bottom member 2 covered by the chassis 3. The imaging unit 21 includes a camera 22, a first mirror 23, and a second mirror 24. The first mirror 23 is formed in a substantially flat plate shape and is provided with a first mirror surface 25. The first mirror 23 is disposed such that the light entering the first mirror surface 25 from the second mirror 24 is reflected toward the camera 22. The second mirror 24 is formed in a substantially flat plate shape and is provided with a second mirror surface 26. The second mirror 24 is disposed such that the light entering the second mirror surface 26 from the portion of the bottom member 2 covered by the chassis 3 is reflected toward the first mirror 23. The camera 22 is disposed so as to be opposed to the first mirror 23 and captures the image of the medium placed on the upper side of the bottom member 2 by using the light reflected by the first mirror 23 and the second mirror 24.

Here, the guide member 4, the left holding member 14, the right holding member 15, and the booklet contact member 27 are formed such that the camera 22 captures the image of a predetermined portion of the medium placed on the upper side of the bottom member 2, that is, the predetermined portion is not covered. For example, the opening 12 is formed such that the camera 22 captures the image of the predetermined portion of the medium, that is, the guide member 4 does not cover the predetermined portion of the medium. As the imaging unit 21 includes the first mirror 23 and the second mirror 24, the distance between the camera 22 and the bottom member 2 may be shortened so that the image reading apparatus 1 may be formed to be compact. Further, the chassis 3 is formed such that the light entering the inside through the front opening 8 and totally reflected by the medium is prevented from entering the camera 22. As the chassis 3 is thus formed, the image reading apparatus 1 may prevent the occurrence of a bright spot due to the appearance of the light outside the chassis 3 in the image captured by the camera 22.

Figure 4:
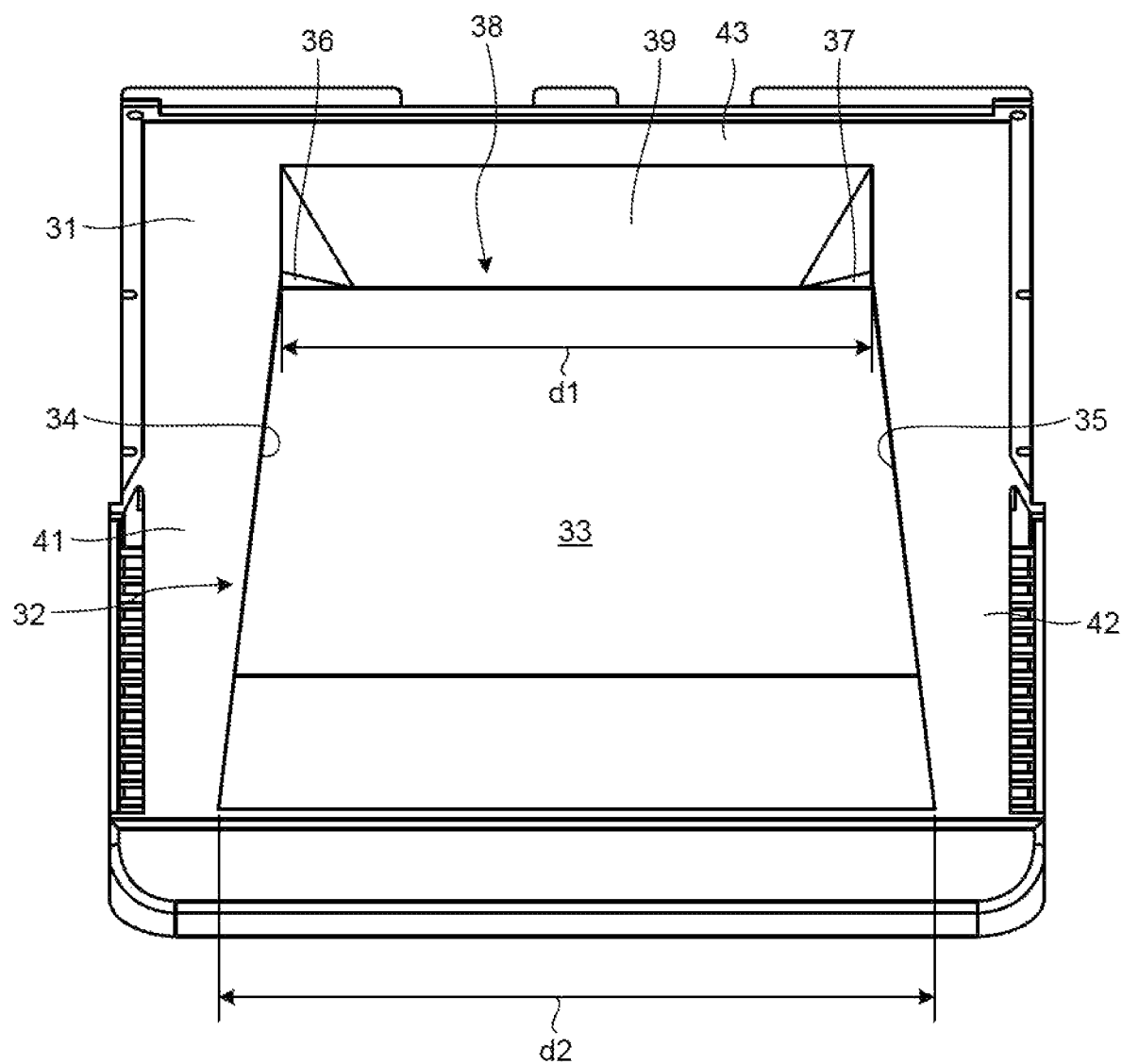
FIG. 4 is a perspective view illustrating a bottom member of the image reading apparatus according to the first embodiment.

FIG. 4 is a perspective view illustrating the bottom member 2 of the image reading apparatus 1 according to the first embodiment. The bottom member 2 is provided with a booklet placement surface 31 and a recess 32. The booklet placement surface 31 is formed on the side of the bottom member 2 on which the chassis 3 is provided and is formed along a plane parallel to another plane along the bottom member 2. The booklet placement surface 31 includes a booklet placement surface left portion 41, a booklet placement surface right portion 42, and a booklet placement surface back portion 43. The booklet placement surface left portion 41 forms the left area of the booklet placement surface 31 and faces the left holding surface 16 of the left holding member 14. The booklet placement surface right portion 42 forms the right area of the booklet placement surface 31 and faces the right holding surface 17 of the right holding member 15. The booklet placement surface back portion 43 forms the back area of the booklet placement surface 31.

The recess 32 is formed substantially in the center of the bottom member 2 on the side where the booklet placement surface 31 is formed and is formed between the booklet placement surface left portion 41 and the booklet placement surface right portion 42. The recess 32 is formed in substantially a trapezoidal shape and is provided with a card placement surface 33, a left card guide surface 34, a right card guide surface 35, a left card contact surface 36, and a right card contact surface 37. The card placement surface 33 forms the bottom of the recess 32 and is formed to be substantially flat along a plane parallel to another plane along the booklet placement surface 31. The left card guide surface 34 is formed between the card placement surface 33 and the booklet placement surface left portion 41 and is formed along a plane perpendicular to another plane along the card placement surface 33. The right card guide surface 35 is formed between the card placement surface 33 and the booklet placement surface right portion 42 and is formed along a plane perpendicular to another plane along the card placement surface 33.

Further, the recess 32 is formed such that a distance d1 between the end of the left card guide surface 34 on the back side and the end of the right card guide surface 35 on the back side is equal to a predetermined length. The predetermined length is, for example, the width of cards and is, for example, 86.5 mm. Further, the recess 32 is formed such that a distance d2 between the end of the left card guide surface 34 on the front side and the end of the right card guide surface 35 on the front side is larger than the distance d1 and is formed such that the distance d2 is equal to, for example, 105 mm.

The left card contact surface 36 is formed at the end of the card placement surface 33 on the back side and on the left side and is formed such that the plane along the left card contact surface 36 is parallel to the straight line along the booklet contact member 27 and is perpendicular to the plane along the card placement surface 33. The left card contact surface 36 is coupled to the end of the card placement surface 33 on the back side and is coupled to the end of the left card guide surface 34 on the back side. The right card contact surface 37 is formed at the end of the card placement surface 33 on the back side and on the right side and is formed so as to extend along the plane along the left card contact surface 36. The right card contact surface 37 is coupled to the end of the card placement surface 33 on the back side and is coupled to the end of the right card guide surface 35 on the back side.

The bottom member 2 is further provided with a cutout 38 and a booklet back end guide surface 39. The cutout 38 is formed between the left card contact surface 36 and the right card contact surface 37. The booklet back end guide surface 39 is formed to be substantially flat, is coupled between the left card contact surface 36 and the right card contact surface 37 at the ends of the card placement surface 33 on the back side, and is coupled to the booklet placement surface back portion 43 of the booklet placement surface 31.

Figure 5:
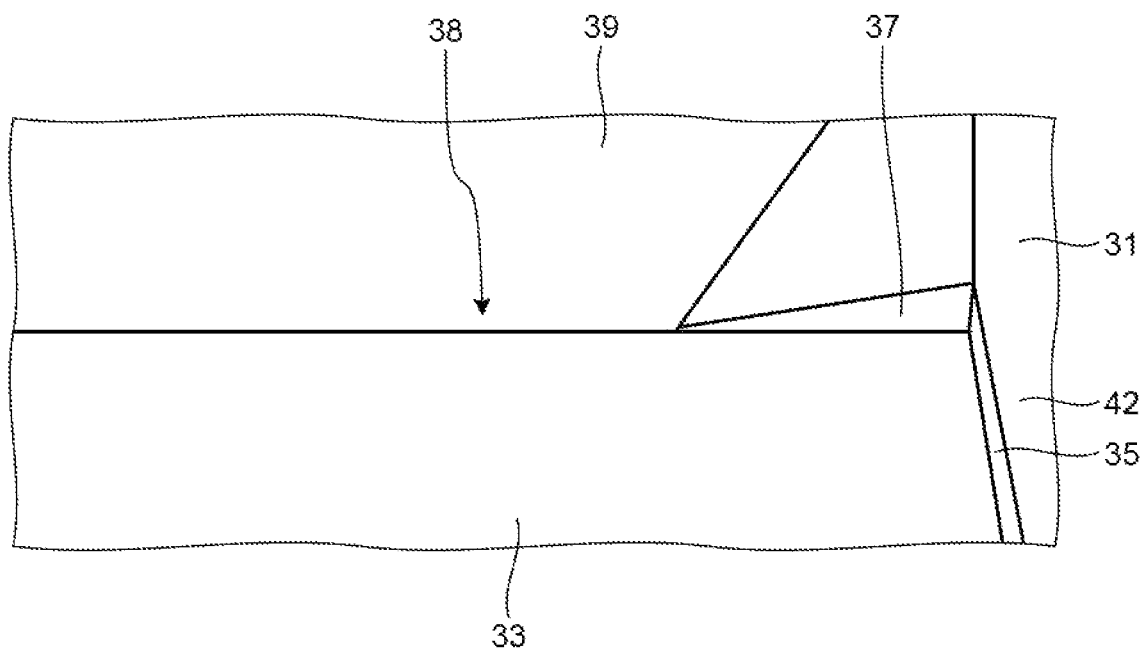
FIG. 5 is a perspective view illustrating a right card contact surface of the image reading apparatus according to the first embodiment.

FIG. 5 is a perspective view illustrating the right card contact surface 37 of the image reading apparatus 1 according to the first embodiment. The right card contact surface 37 is formed in substantially a triangular shape so that one side thereof is coupled to the card placement surface 33 and another side is coupled to the right card guide surface 35. The other side of the right card contact surface 37, which is coupled to neither the card placement surface 33 nor the right card guide surface 35, is formed to be oblique so as to be farther away from the plane along the booklet placement surface 31 as it is farther away from the right card guide surface 35.

Figure 6:
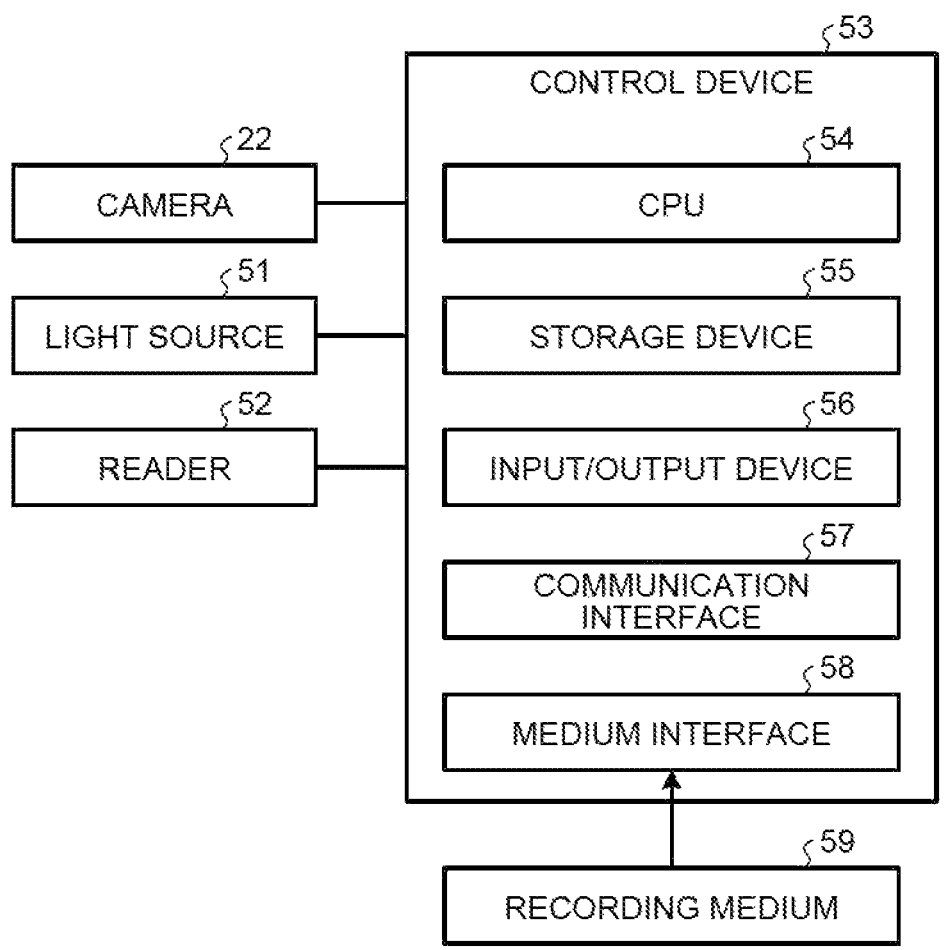
FIG. 6 is a block diagram illustrating the image reading apparatus according to the first embodiment.

FIG. 6 is a block diagram illustrating the image reading apparatus 1 according to the first embodiment. The image reading apparatus 1 further includes a light source 51, a reader 52, and a control device 53. The light source 51 is disposed inside the chassis 3. The light source 51 is, for example, an LED (Light Emitting Diode) and is controlled by the control device 53 so as to illuminate the medium placed on the bottom member 2. The reader 52 is embedded inside the bottom member 2. The reader 52 is controlled by the control device 53 so as to read information via an RFID (Radio Frequency Identifier) from a tag provided near the reader 52. Specifically, the reader 52 transmits an interrogation radio wave and receives the response radio wave transmitted from the tag by using the electric power generated from the interrogation radio wave so as to read the information recorded in the tag.

The control device 53 is a computer and includes a CPU 54 (Central Processing Unit), a storage device 55, an input/output device 56, a communication interface 57, and a medium interface 58. The CPU 54 executes a computer program installed in the control device 53 to perform information processing and control the storage device 55, the input/output device 56, and the camera 22. Examples of the storage device 55 include a memory such as a RAM or a ROM, a fixed disk device such as a hard disk, and an SSD (Solid State Drive). The storage device 55 stores a computer program installed in the control device 53 and stores the information used by the CPU 54. The input/output device 56 outputs the information generated in accordance with the user's operation to the CPU 54 and outputs the information generated by the CPU 54 so as to be recognized by the user.

The communication interface 57 is controlled by the CPU 54 to download information from a different computer connected via a communication line to the control device 53 or transmit information from the control device 53 to a different computer. The medium interface 58 is configured such that a non-transitory tangible recording medium 59 may be loaded therein. Examples of the recording medium 59 include a semiconductor memory, a magnetic disk, a magneto-optical disk, and an optical disk. When the recording medium 59 is loaded, the medium interface 58 is controlled by the CPU 54 so as to read information from the recording medium 59 or store information in the recording medium 59. Furthermore, the computer program installed in the control device 53 may be downloaded from a different computer via the communication interface 57 or may be read from the recording medium 59 via the medium interface 58.

Operation of the Image Reading Apparatus 1

Figure 7:
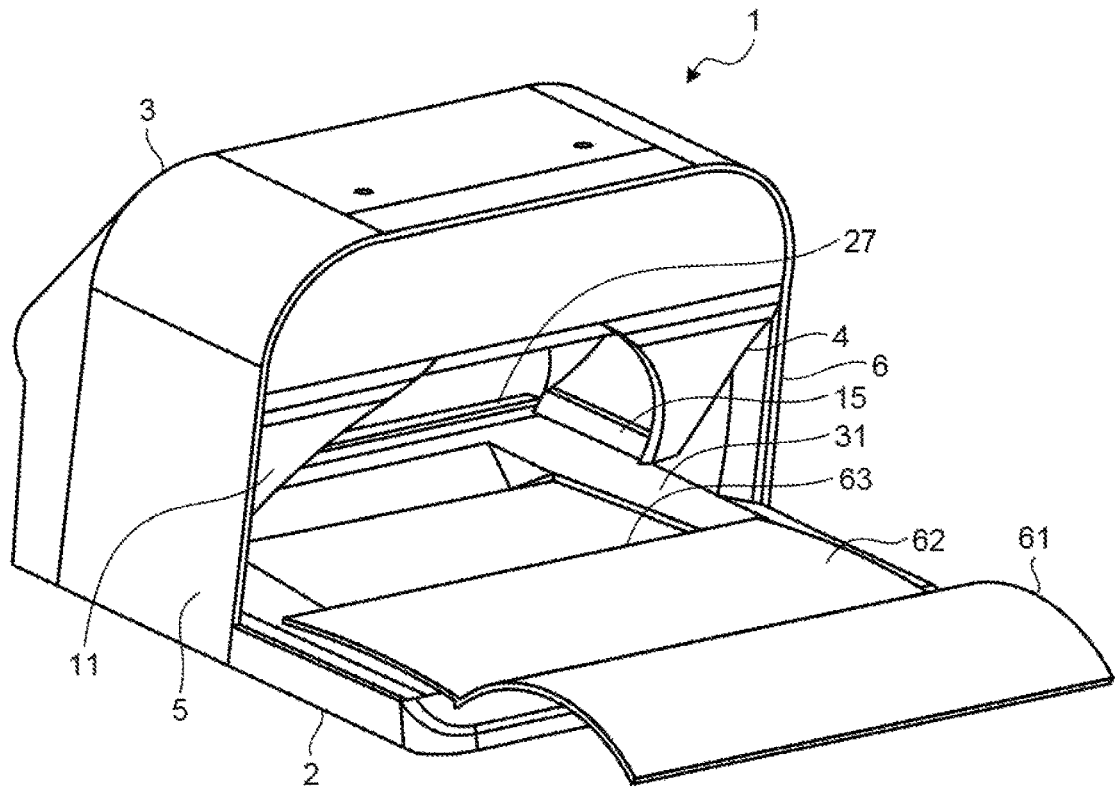
FIG. 7 is a perspective view illustrating a state where a booklet is inserted through a front opening of the image reading apparatus according to the first embodiment.

To read the image of a certain page 62 of a booklet 61, the user opens the booklet 61 such that the page 62 faces upward and inserts the booklet 61 into the chassis 3 through the front opening 8 such that a booklet back end 63 on the side of the page 62 faces the back side, as illustrated in FIG. 7. FIG. 7 is a perspective view illustrating a state where the booklet 61 is inserted through the front opening 8 of the image reading apparatus 1 according to the first embodiment. Examples of the booklet 61 include a passport. When the booklet 61 is inserted to the back side, the left end of the booklet 61 is inserted between the bottom member 2 and the left holding member 14 along the left side wall 5. when the booklet 61 is inserted to the back side, the right end of the booklet 61 is inserted between the bottom member 2 and the right holding member 15 along the right side wall 6.

Figure 8:
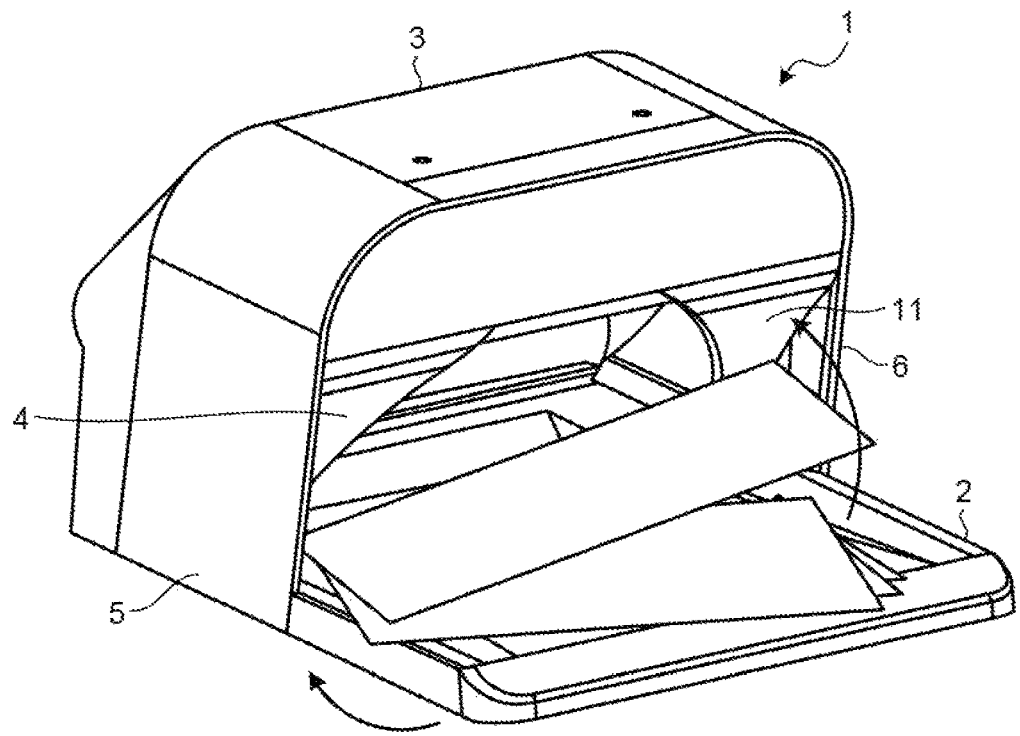
FIG. 8 is a perspective view illustrating a state where the booklet is obliquely inserted through the front opening of the image reading apparatus according to the first embodiment.

FIG. 8 is a perspective view illustrating a state where the booklet 61 is obliquely inserted through the front opening 8 of the image reading apparatus 1 according to the first embodiment. Even when the booklet 61 is obliquely inserted through the front opening 8, the left end and the right end of the booklet 61 are guided by the left side wall 5 and the right side wall 6, respectively, so that the left end and the right end may be disposed so as to extend along the left side wall 5 and the right side wall 6. Even when the right end of the booklet 61 is inserted through the front opening 8 while the booklet 61 is separated from the bottom member 2, it is guided by the guide surface 11 of the guide member 4 so as to be inserted between the bottom member 2 and the right holding member 15. Even when the left end of the booklet 61 is inserted through the front opening 8 while the booklet 61 is separated from the bottom member 2, it is guided by the guide surface 11 of the guide member 4 so as to be inserted between the bottom member 2 and the left holding member 14.

Figure 9:
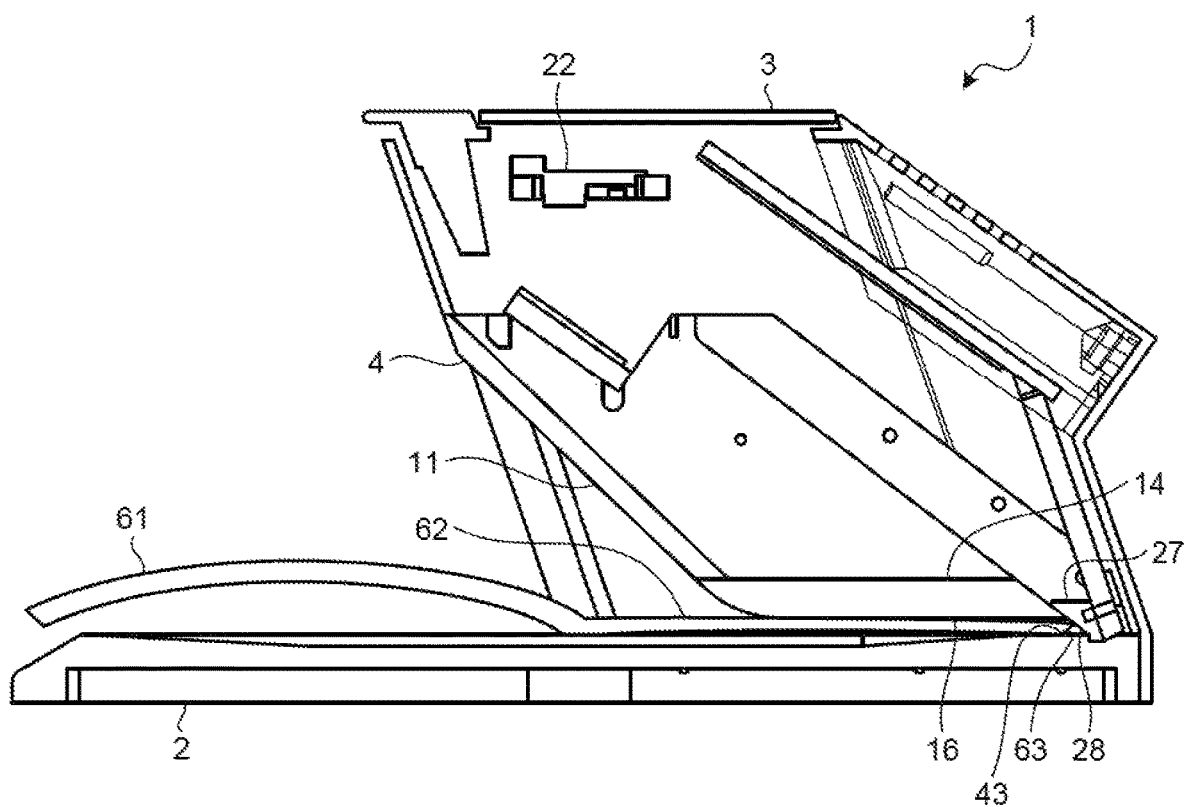
FIG. 9 is a cross-sectional view illustrating a state where a booklet back end of the booklet is in contact with a booklet contact surface of the image reading apparatus according to the first embodiment.

After the left end of the booklet 61 is inserted between the bottom member 2 and the left holding member 14 and the right end is inserted between the bottom member 2 and the right holding member 15, the user further inserts the booklet 61 toward the back side. Here, as the opening 12 is formed in the guide member 4, the user's hand does not interfere with the guide member 4 even when the booklet 61 is further inserted to the back side while the upper surface of the booklet 61 is pressed by the hand, whereby the booklet 61 may be easily inserted to the back side. When the booklet 61 is further inserted to the back side, the booklet back end 63 of the booklet 61 is brought into contact with the booklet contact surface 28 of the booklet contact member 27, as illustrated in FIG. 9. FIG. 9 is a cross-sectional view illustrating a state where the booklet back end 63 of the booklet 61 is in contact with the booklet contact surface 28 of the image reading apparatus 1 according to the first embodiment. Here, as the cutout 38 and the booklet back end guide surface 39 are formed in the bottom member 2, the booklet back end 63 is not likely to be brought into contact with the left card contact surface 36 and the right card contact surface 37 even when the middle of the booklet back end 63 enters the recess 32. This allows the booklet 61 to be smoothly inserted to the back side until it is brought into contact with the booklet contact member 27.

Figure 10:
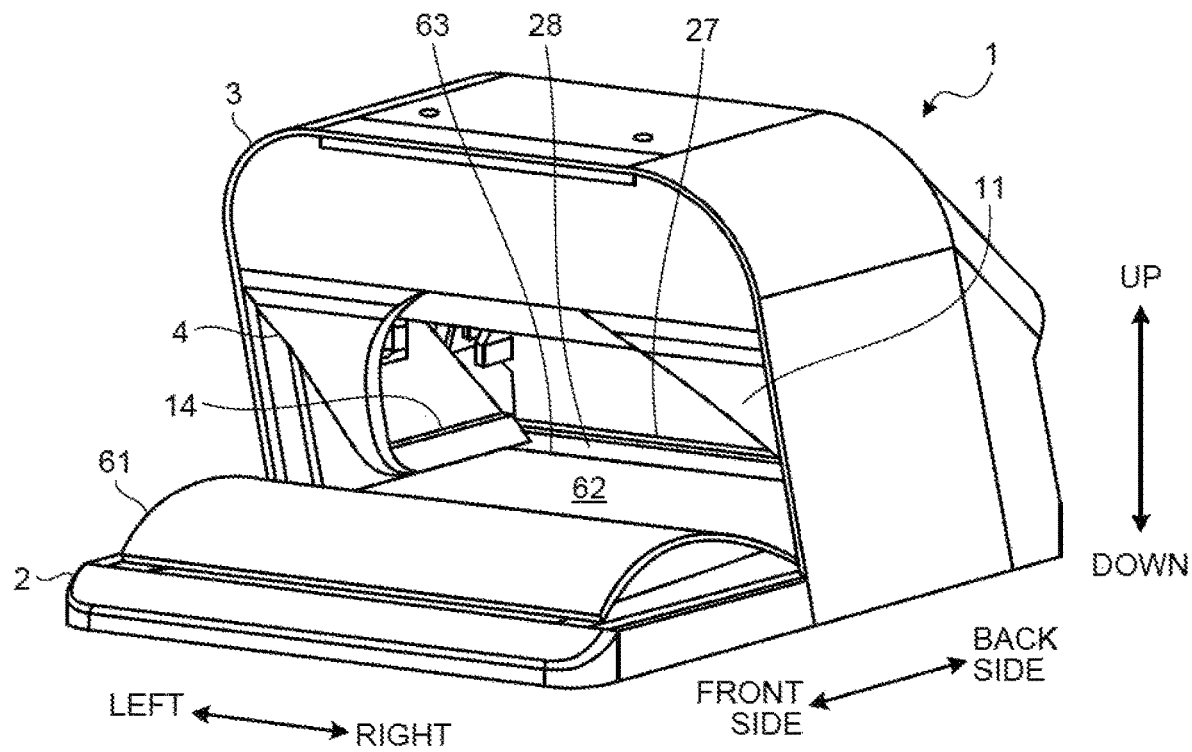
FIG. 10 is a perspective view illustrating a state where the booklet is placed at a predetermined position of the image reading apparatus according to the first embodiment.

When the booklet back end 63 is brought into contact with the booklet contact surface 28, it is guided by the booklet contact surface 28 and is pressed against the booklet placement surface back portion 43 of the booklet placement surface 31 so as to extend along the booklet placement surface back portion 43. Therefore, even when the booklet back end 63 of the booklet 61 has a bending tendency to bend in a concave upward form, it is possible to prevent floating, i.e., the booklet back end 63 of the booklet 61 is separated from the booklet placement surface back portion 43 of the booklet placement surface 31. When the booklet back end 63 is brought into contact with the booklet contact surface 28 of the booklet contact member 27, the page 62 of the booklet 61 is placed at a predetermined position of the image reading apparatus 1 as illustrated in FIG. 10. FIG. 10 is a perspective view illustrating a state where the booklet 61 is placed at the predetermined position of the image reading apparatus 1 according to the first embodiment.

After the page 62 of the booklet 61 is placed at the predetermined position, the user operates the input/output device 56 so as to read the image of the page 62. When the input/output device 56 is operated, the control device 53 controls the light source 51 so as to illuminate the page 62. When the page 62 is illuminated, the control device 53 controls the camera 22 so as to capture the image of the area of the page 62 that is not covered by the guide member 4, the left holding member 14, the right holding member 15, or the booklet contact member 27. After the image of the page 62 is captured, the control device 53 turns off the light source 51 and controls the storage device 55 so as to store the image captured by the camera 22 in the storage device 55.

After the image of the page 62 is captured, the control device 53 controls the reader 52 so as to read the information stored in the tag provided in the booklet 61. Here, as the reader 52 is provided inside the bottom member 2, it may be disposed near the tag provided in the booklet 61 so that the information may be read as appropriate from the tag. After the information is read from the tag, the control device 53 controls the storage device 55 so as to store the information read by the reader 52 in the storage device 55. The control device 53 controls the communication interface 57 so as to transmit the image and the information stored in the storage device 55 to a different computer. Furthermore, the control device 53 controls the medium interface 58 so as to store, in the recording medium 59, the image and the information stored in the storage device 55.

Figure 11:
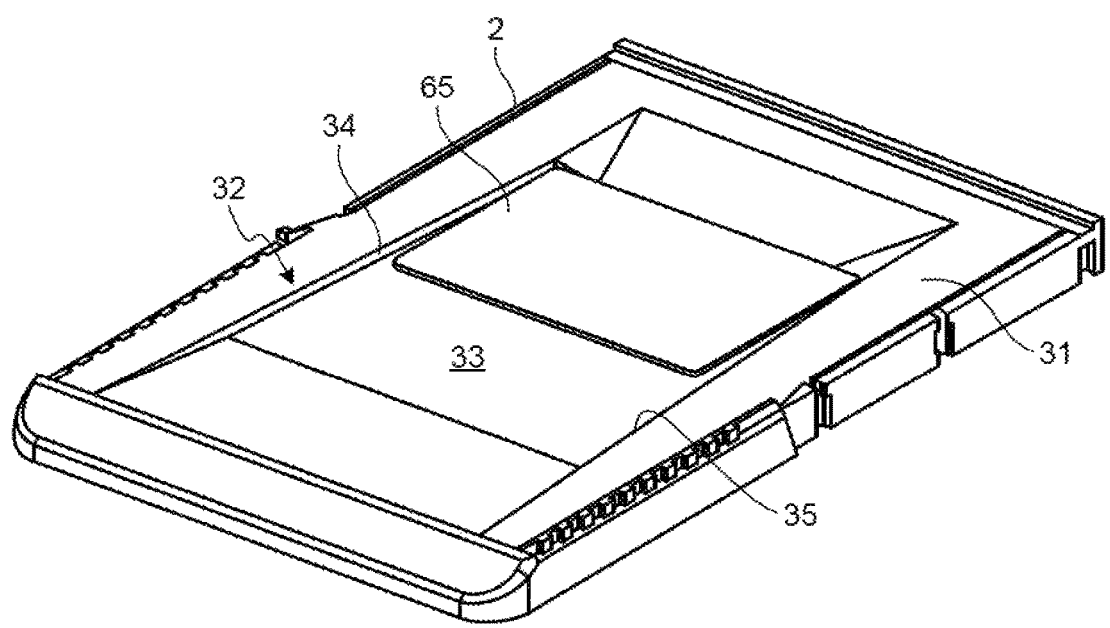
FIG. 11 is a perspective view illustrating a state where a card is placed inside a recess of the image reading apparatus according to the first embodiment.
Figure 12:
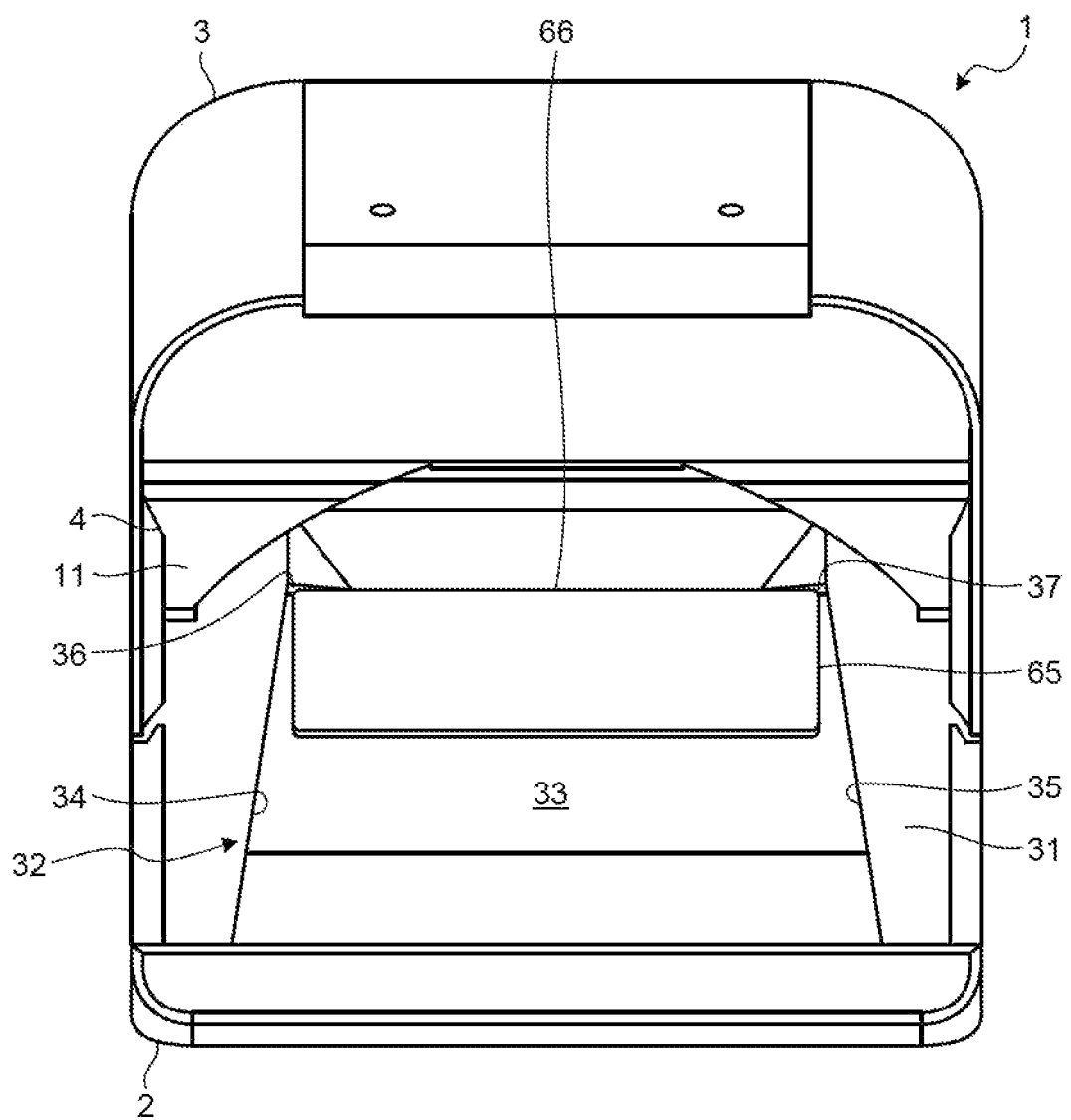
FIG. 12 is another perspective view illustrating a state where the card is placed inside the recess of the image reading apparatus according to the first embodiment.
Figure 13:
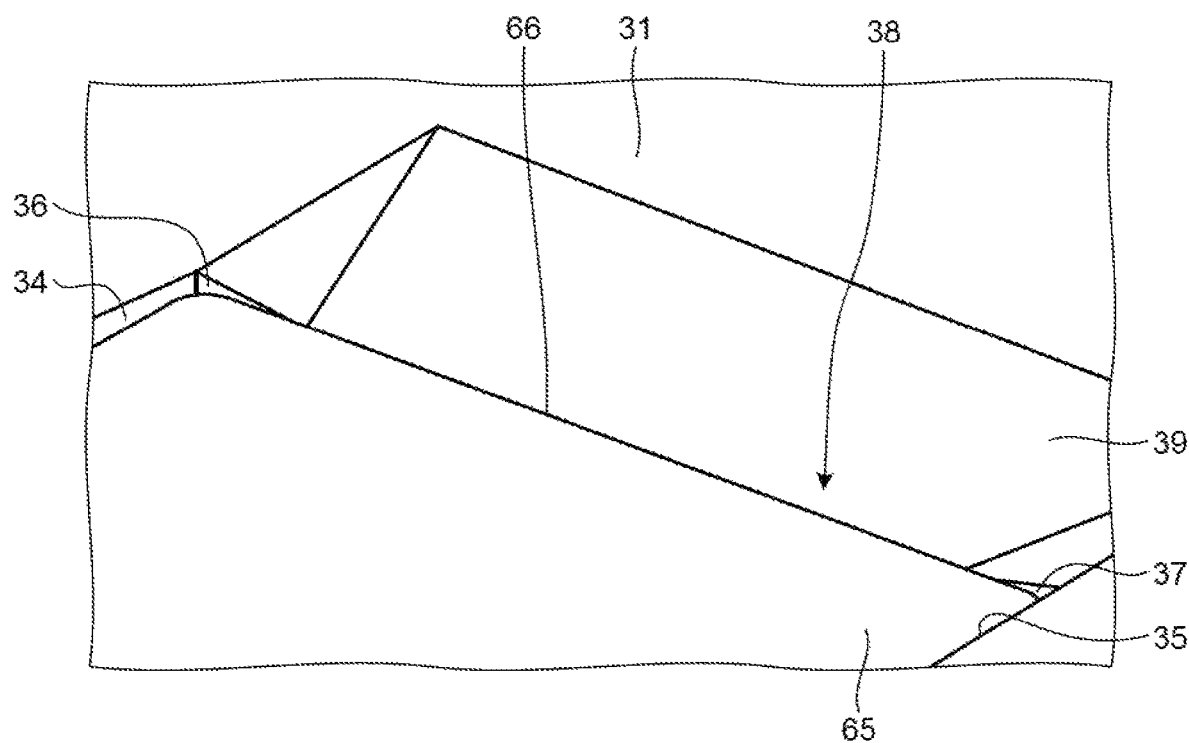
FIG. 13 is an enlarged perspective view illustrating a state where the card is placed at a predetermined position of the image reading apparatus according to the first embodiment.

To read the image of a card 65 using the image reading apparatus 1, the user puts the card 65 inside the recess 32 of the bottom member 2 to place the card 65 on the card placement surface 33, as illustrated in FIG. 11. FIG. 11 is a perspective view illustrating a state where the card 65 is placed inside the recess 32 of the image reading apparatus 1 according to the first embodiment. FIG. 12 is another perspective view illustrating a state where the card 65 is placed inside the recess 32 of the image reading apparatus 1 according to the first embodiment. After placing the card 65 on the card placement surface 33, the user moves the card 65 to the back side. After the card 65 is moved to the back side, a card back end 66 of the card 65 on the back side is brought into contact with the left card contact surface 36 and the right card contact surface 37 and is placed at a predetermined position, as illustrated in FIG. 13. FIG. 13 is an enlarged perspective view illustrating a state where the card 65 is placed at a predetermined position of the image reading apparatus 1 according to the first embodiment.

After the card 65 is placed at the predetermined position, the user operates the input/output device 56 so as to read the image of the card 65. After the input/output device 56 is operated, the control device 53 controls the light source 51 so as to illuminate the card 65. When the card 65 is illuminated, the control device 53 controls the camera 22 so as to capture the image of the card 65. After the image of the card 65 is captured, the control device 53 turns off the light source 51 and controls the storage device 55 so as to store the image captured by the camera 22 in the storage device 55. The control device 53 controls the communication interface 57 so as to transmit the image stored in the storage device 55 to a different computer or controls the medium interface 58 so as to store, in the recording medium 59, the image stored in the storage device 55.

Advantage of the Image Reading Apparatus 1
According to the First Embodiment The image reading apparatus 1 according to the first embodiment includes the left holding member 14, the right holding member 15, the guide member 4, and the imaging unit 21. The left holding member 14 is provided with the left holding surface 16 that is opposed to the booklet placement surface 31. The right holding member 15 is provided with the right holding surface 17 that is opposed to the booklet placement surface 31. The imaging unit 21 is disposed so as to face the booklet placement surface 31 and capture the image of the predetermined page 62 of the booklet 61 placed on the booklet placement surface 31. The guide member 4 is disposed on the front side of the left holding member 14 and the right holding member 15 and is provided with the guide surface 11 coupled to the left holding surface 16 and the right holding surface 17. The guide member 4 is disposed to be oblique such that the distance from the booklet placement surface 31 to the end of the guide surface 11 on the back side is smaller than the distance from the booklet placement surface 31 to the end of the guide surface 11 on the front side. The above-described image reading apparatus 1 may facilitate the operation of appropriately inserting both edges of the page 62 of the booklet 61 under the left holding member 14 and the right holding member 15.

Furthermore, the guide member 4 of the image reading apparatus 1 according to the first embodiment includes the opening 12 that is formed between the guide surface left portion 18 of the guide surface 11 coupled to the left holding surface 16 and the guide surface right portion 19 of the guide surface 11 coupled to the right holding surface 17. The guide member 4 is formed such that the width of the opening 12 is smaller than the width of the gap formed between the left holding member 14 and the right holding member 15. In the image reading apparatus 1, the user's hand is passed through the opening 12 of the guide member 4 and therefore is prevented from interfering with the guide member 4 even when the booklet 61 is inserted to the back side while the upper surface of the booklet 61 is pressed by the hand, whereby the booklet 61 may be easily inserted. In the image reading apparatus 1, as the width of the opening 12 is smaller than the width of the booklet 61, the booklet 61 may be prevented from entering the opening 12, and the booklet 61 may be guided as appropriate to a predetermined position.

Furthermore, the image reading apparatus 1 according to the first embodiment further includes the booklet contact member 27 provided with the booklet contact surface 28 opposed to the booklet back end 63 of the booklet 61 on the back side. The booklet contact surface 28 is formed such that the distance from the booklet placement surface 31 to the end of the booklet contact surface 28 on the back side is smaller than the distance from the booklet placement surface 31 to the end of the booklet contact surface 28 on the front side. In the image reading apparatus 1, it is possible to prevent floating, i.e., the booklet back end 63 of the booklet 61 on the back side is separated from the booklet placement surface 31, and it is possible to place the booklet 61 as appropriate. As the booklet 61 is placed as appropriate, the image reading apparatus 1 may appropriately capture the image of the booklet 61.

Further, the image reading apparatus 1 according to the first embodiment further includes the bottom member 2 on which the booklet placement surface 31 is formed. The bottom member 2 is provided with the recess 32 between the booklet placement surface left portion 41 of the booklet placement surface 31 opposed to the left holding surface 16 and the booklet placement surface right portion 42 of the booklet placement surface 31 opposed to the right holding surface 17 so as to receive the card 65 smaller than the booklet 61. In the image reading apparatus 1, the card 65 whose both ends are not held by the left holding surface 16 or the right holding surface 17 may be placed at a predetermined position, and the image of the card 65 may be captured as appropriate.

Further, the bottom member 2 of the image reading apparatus 1 according to the first embodiment is further provided with the left card contact surface 36, the right card contact surface 37, and the cutout 38. The left card contact surface 36 is opposed to the left end of the card back end 66 of the card 65 on the back side. The right card contact surface 37 is opposed to the right end of the card back end 66. The cutout 38 is provided between the left card contact surface 36 and the right card contact surface 37. In the image reading apparatus 1, it is possible to prevent the booklet 61 from being brought into contact with the left card contact surface 36 and the right card contact surface 37 when the booklet 61 is inserted to the back side, and it is possible to easily insert the booklet 61.

Furthermore, the image reading apparatus 1 according to the first embodiment further includes the bottom member 2 provided with the booklet placement surface 31 and the reader 52 that reads information from the tag. The reader 52 is disposed inside the bottom member 2. In the image reading apparatus 1, the reader 52 may be disposed near the booklet 61, and the information in the tag provided in the booklet 61 may be read as appropriate.

Second Embodiment

Figure 14:
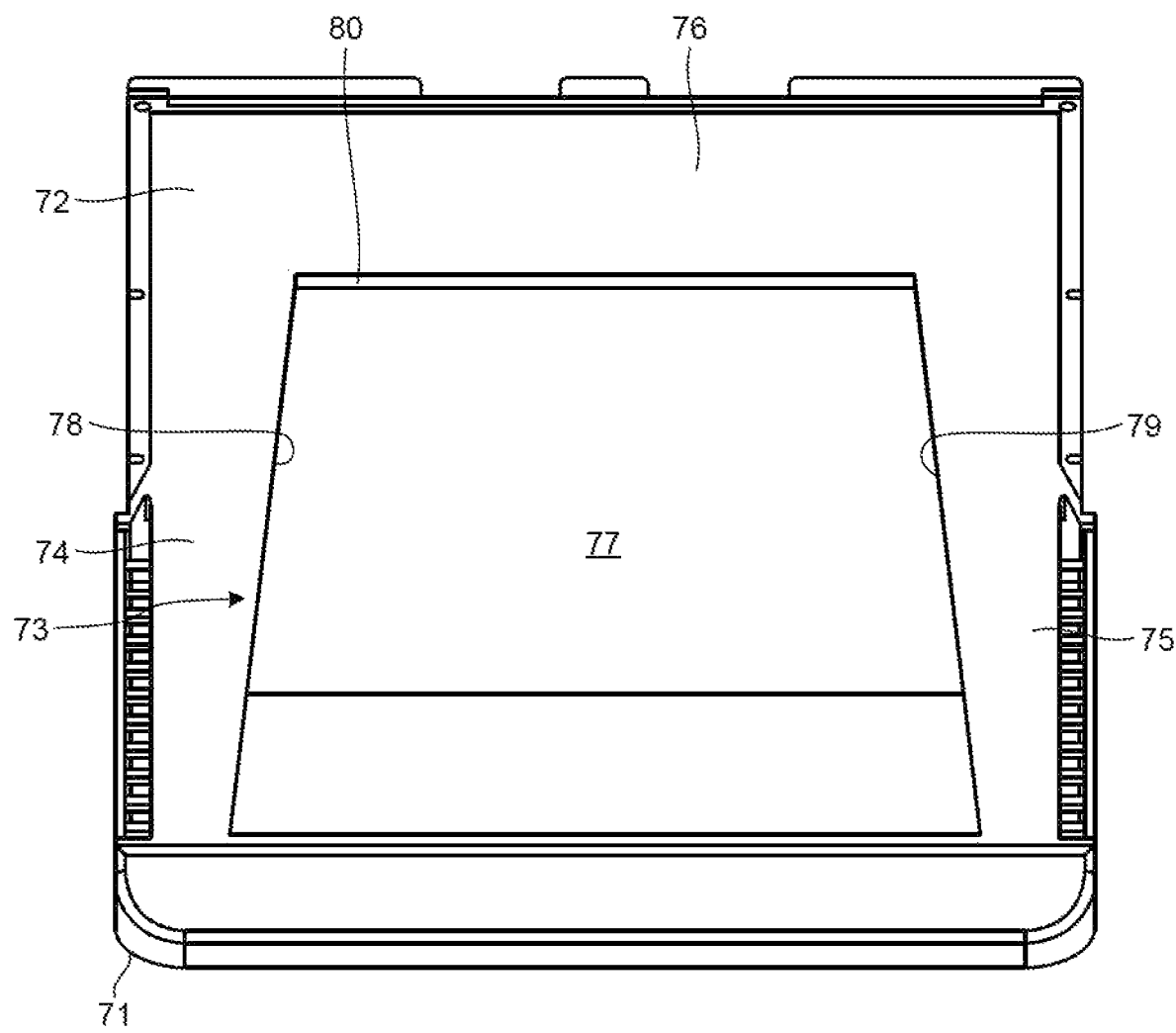
FIG. 14 is a perspective view illustrating a bottom member of an image reading apparatus according to a second embodiment.

Furthermore, although the bottom member 2 of the image reading apparatus 1 according to the above-described first embodiment is provided with the cutout 38 and the booklet back end guide surface 39, the cutout 38 and the booklet back end guide surface 39 may be omitted. In an image reading apparatus according to a second embodiment, as illustrated in FIG. 14, the bottom member 2 of the image reading apparatus 1 according to the above-described first embodiment is replaced with a different bottom member 71, and the other portions are the same as those of the image reading apparatus 1 according to the above-described first embodiment. FIG. 14 is a perspective view illustrating the bottom member 71 of the image reading apparatus according to the second embodiment. In the same manner as the bottom member 2, the bottom member 71 is formed in substantially a plate shape, is placed on an installation surface where the image reading apparatus according to the second embodiment is installed, and is provided with a booklet placement surface 72 and a recess 73. The booklet placement surface 72 includes a booklet placement surface left portion 74, a booklet placement surface right portion 75, and a booklet placement surface back portion 76. In the same manner as the above-described booklet placement surface left portion 41, the booklet placement surface left portion 74 forms a left area of the booklet placement surface 72 and faces the left holding surface 16 of the left holding member 14. In the same manner as the above-described booklet placement surface right portion 42, the booklet placement surface right portion 75 forms a right area of the booklet placement surface 72 and faces the right holding surface 17 of the right holding member 15. The booklet placement surface back portion 76 forms a back area of the booklet placement surface 72.

In the same manner as the above-described recess 32, the recess 73 is formed between the booklet placement surface left portion 74 and the booklet placement surface right portion 75. The recess 73 is provided with a card placement surface 77, a left card guide surface 78, a right card guide surface 79, and a card contact surface 80. In the same manner as the above-described card placement surface 33, the card placement surface 77 forms the bottom of the recess 73 and is formed to be substantially flat so as to extend along a plane parallel to another plane along the booklet placement surface 72. In the same manner as the above-described left card guide surface 34, the left card guide surface 78 is formed between the card placement surface 77 and the booklet placement surface left portion 74 and is formed to extend along a plane perpendicular to another plane along the card placement surface 77. In the same manner as the above-described right card guide surface 35, the right card guide surface 79 is formed between the card placement surface 77 and the booklet placement surface right portion 75 and is formed to extend along a plane perpendicular to another plane along the card placement surface 77.

The card contact surface 80 is formed between the card placement surface 77 and the booklet placement surface back portion 76 and is coupled to the card placement surface 77 and the booklet placement surface back portion 76. The card contact surface 80 is coupled to the back end of the left card guide surface 78 and is coupled to the back end of the right card guide surface 79. The card contact surface 80 is formed such that the plane along the card contact surface 80 is parallel to the straight line along the booklet contact member 27 and is perpendicular to the plane along the card placement surface 77.

The image reading apparatus according to the second embodiment may be used similarly to the image reading apparatus 1 according to the first embodiment described above, and it is possible to facilitate the operation of appropriately inserting both edges of the page 62 of the booklet 61 under the left holding member 14 and the right holding member 15. In the image reading apparatus according to the second embodiment, when the booklet 61 is inserted, the booklet back end 63 of the booklet 61 may strike on the card contact surface 80, which prevents the booklet 61 from being placed at a predetermined position as appropriate. In the image reading apparatus 1 according to the first embodiment, as the cutout 38 and the booklet back end guide surface 39 are formed, the booklet back end 63 may be prevented from striking on the card contact surface 80, and the booklet 61 may be placed more appropriately as compared with the image reading apparatus according to the second embodiment.

Furthermore, in the image reading apparatuses according to the above-described first and second embodiments, the bottom members 2, 71 are provided with the recesses 32, 73 to receive the card 65; however, the recesses 32, 73 may be omitted. In this case, too, the image reading apparatus may facilitate the operation of appropriately inserting both edges of the page 62 of the booklet 61 under the left holding member 14 and the right holding member 15.

Third Embodiment

Figure 15:
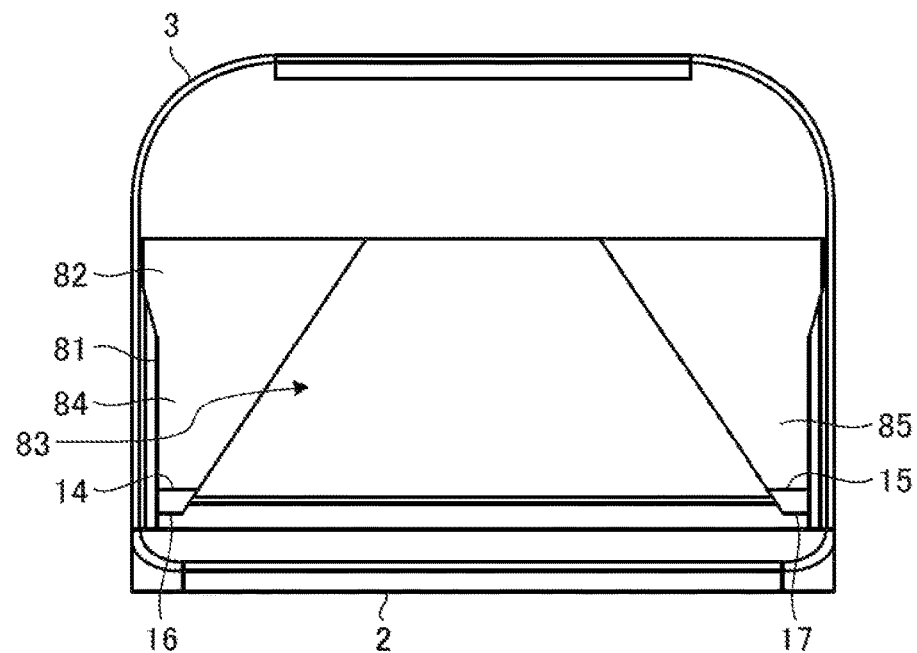
FIG. 15 is a front view illustrating an image reading apparatus according to a third embodiment.

Furthermore, although the image reading apparatus 1 according to the above-described first embodiment includes the opening 12 whose edge is formed to extend along the circular arc, the edge may be formed in a shape other than a circular arc. In an image reading apparatus according to a third embodiment, as illustrated in FIG. 15, the guide member 4 of the image reading apparatus 1 according to the above-described first embodiment is replaced with a different guide member 81, and the other portions are the same as those of the image reading apparatus 1 according to the first embodiment described above. FIG. 15 is a front view illustrating the image reading apparatus according to the third embodiment. The guide member 81 is formed in substantially a flat plate shape and is provided with a guide surface 82 and an opening 83. The guide member 81 is disposed inside the chassis 3 such that the guide surface 82 is exposed through the front opening 8. The guide member 81 is secured to the chassis 3. The guide surface 82 includes a guide surface left portion 84 coupled to the left holding surface 16 and a guide surface right portion 85 coupled to the right holding surface 17. The opening 83 is formed between the guide surface left portion 84 and the guide surface right portion 85 and is formed such that the edge extends along a straight line. Further, the guide member 81 is formed such that the diameter of the opening 83 is shorter than the predetermined length. Further, the opening 83 is formed such that the camera 22 captures the image of a predetermined area of the booklet 61 placed at a predetermined position, that is, the guide member 81 does not cover the predetermined area of the booklet 61.

The image reading apparatus according to the third embodiment may be used similarly to the image reading apparatus 1 according to the first embodiment described above, and it is possible to facilitate the operation of appropriately inserting both edges of the page 62 of the booklet 61 under the left holding member 14 and the right holding member 15.

Fourth Embodiment

Figure 16:
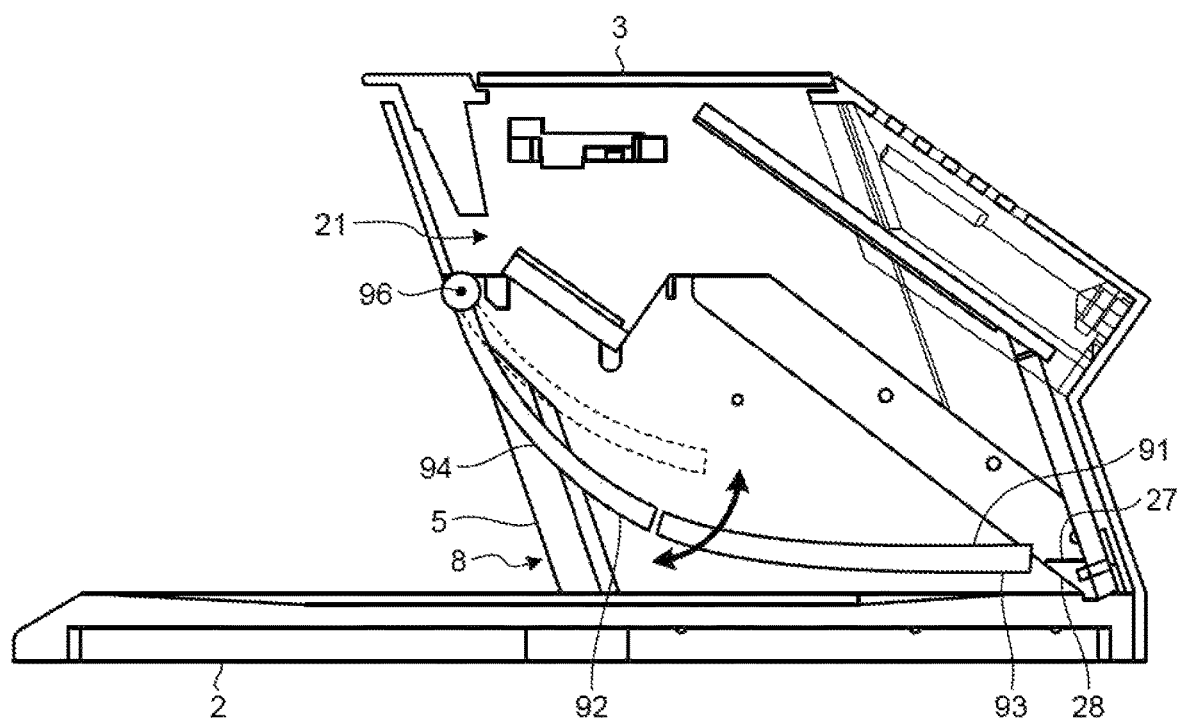
FIG. 16 is a cross-sectional view illustrating an image reading apparatus according to a fourth embodiment.

Furthermore, in the image reading apparatus 1 according to the first embodiment described above, the guide surface 11 of the guide member 4, the left holding surface 16 of the left holding member 14, and the right holding surface 17 of the right holding member 15 are formed to extend along a plane; however, they may be formed to extend along a bent and curved surface. In an image reading apparatus according to a fourth embodiment, as illustrated in FIG. 16, the left holding member 14 of the image reading apparatus 1 according to the above-described first embodiment is replaced with a different left holding member 91, and the guide member 4 is replaced with a different guide member 92. FIG. 16 is a cross-sectional view illustrating the image reading apparatus according to the fourth embodiment.

The guide member 92 is formed in a bent plate shape and is provided with a guide surface 94 that is convex. The guide member 92 is supported by the chassis 3 to rotate around a rotation axis 96 so as to be disposed in a guide position or an expansion position. The guide member 92 is disposed such that, when the guide member 92 is disposed in the expansion position, the space surrounded by the front opening 8, the guide member 92, and the bottom member 2 is larger than that when it is disposed in the guide position. The image reading apparatus according to the fourth embodiment further includes a stopper that is not illustrated. When the guide member 92 is disposed in the guide position, the stopper restricts the rotation of the guide member 92 to prevent the guide member 92 from rotating in a clockwise direction in FIG. 16. Further, when the guide member 92 is disposed in the expansion position, the stopper restricts the rotation of the guide member 92 to prevent the guide member 92 from rotating in a counterclockwise direction in FIG. 16. The guide member 92 is formed such that, when it is disposed at a position different from the guide position, the gravity acts on the guide member 92 so as to rotate in a clockwise direction in FIG. 16 toward the guide position.

The left holding member 91 is formed in a band shape and is provided with a left holding surface 93 that is convex. The left holding member 91 is disposed in a left area inside the chassis 3 and is secured to the chassis 3 such that the left holding surface 93 is opposed to the bottom member 2. Further, in the image reading apparatus according to the fourth embodiment, the right holding member 15 of the image reading apparatus 1 according to the above-described first embodiment is replaced with a different right holding member. In the same manner as the left holding member 91, the right holding member is provided with a right holding surface, which is convex, and is disposed in a right area inside the chassis 3 and is secured to the chassis 3 such that the right holding surface is opposed to the bottom member 2.

The image reading apparatus according to the fourth embodiment may be used similarly to the image reading apparatus 1 according to the above-described first embodiment, and it is possible to facilitate the operation of appropriately inserting both edges of the page 62 of the booklet 61 under the left holding member 14 and the right holding member 15. As the guide surface 94 of the image reading apparatus according to the fourth embodiment extends downward along the curved surface that is convex, it may be coupled to the left holding surface 93 and the right holding surface more smoothly as compared with the guide surface 11 of the image reading apparatus 1 according to the above-described first embodiment. As the left holding surface 93 of the image reading apparatus according to the fourth embodiment extends downward along the curved surface that is convex, it may be coupled to the guide surface 94 more smoothly as compared with the left holding surface 16 of the image reading apparatus 1 according to the above-described first embodiment. In the image reading apparatus according to the fourth embodiment, as the guide surface 94 is smoothly coupled to the left holding surface 93 and the right holding surface, the booklet 61 may be smoothly guided under the left holding surface 93 and the right holding surface.

The user's hand sometimes interferes with the guide member 92 when the booklet 61 is inserted to the back side while the upper surface of the booklet 61 is pressed by the hand. In the image reading apparatus according to the fourth embodiment, when the guide member 92 interferes with the user's hand, the guide member 92 rotates toward the expansion position, whereby it is possible to extend the range where the user's hand may be placed and it is possible to facilitate insertion of the booklet 61.

Furthermore, although both the left holding surface 93 and the guide surface 94 of the image reading apparatus according to the fourth embodiment extend along a curved surface that is convex, one of them may be formed to be flat. In the image reading apparatus according to the fourth embodiment, even when one of them is formed to be flat, the left holding surface 93 and the guide surface 94 may be coupled smoothly as compared to a case where both of them are flat.

Although the guide member 92 moves to the guide position due to its own weight in the image reading apparatus according to the fourth embodiment, a biasing unit may be provided to apply a force to the guide position such that the guide member 92 moves to the guide position. Examples of the biasing unit include an elastic member that gives an elastic force to the guide member 92 such that the guide member 92 moves to the guide position. In the image reading apparatus according to the fourth embodiment, even when the above-described biasing unit is provided, it is possible to expand the range where the user's hand may be placed, and it is possible to facilitate insertion of the booklet 61. Further, although the guide member 92 is rotatably supported by the chassis 3, it may be movably supported by the chassis 3 due to a movement other than rotation. Examples of the movement include a translational motion. Even in this case, the image reading apparatus according to the fourth embodiment makes it possible to expand the range where the user's hand may be placed and to facilitate insertion of the booklet 61.

Fifth Embodiment

Figure 17:
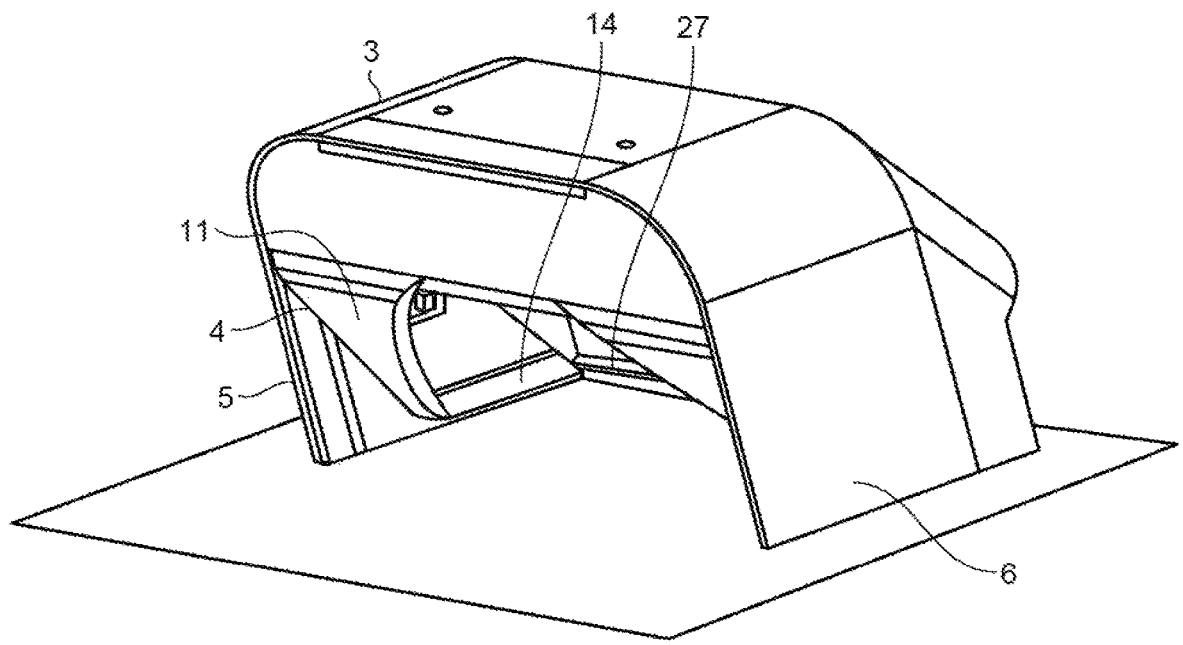
FIG. 17 is a perspective view illustrating an image reading apparatus according to a fifth embodiment.

Furthermore, although the image reading apparatuses according to the above-described embodiments include the bottom members 2, 71, the bottom members 2, 71 may be omitted. As illustrated in FIG. 17, in an image reading apparatus according to a fifth embodiment, the bottom member 2 is omitted from the image reading apparatus 1 according to the above-described first embodiment. FIG. 17 is a perspective view illustrating the image reading apparatus according to the fifth embodiment. Here, the left holding member 14 is disposed such that the left holding surface 16 is opposed to the installation surface where the image reading apparatus according to the fifth embodiment is installed, and the right holding member 15 is disposed such that the right holding surface 17 is opposed to the installation surface. As the image reading apparatus according to the fifth embodiment does not include the bottom member 2, the number of components is smaller and the manufacturing cost is lower as compared with the image reading apparatus 1 according to the first embodiment described above.

Figure 18:
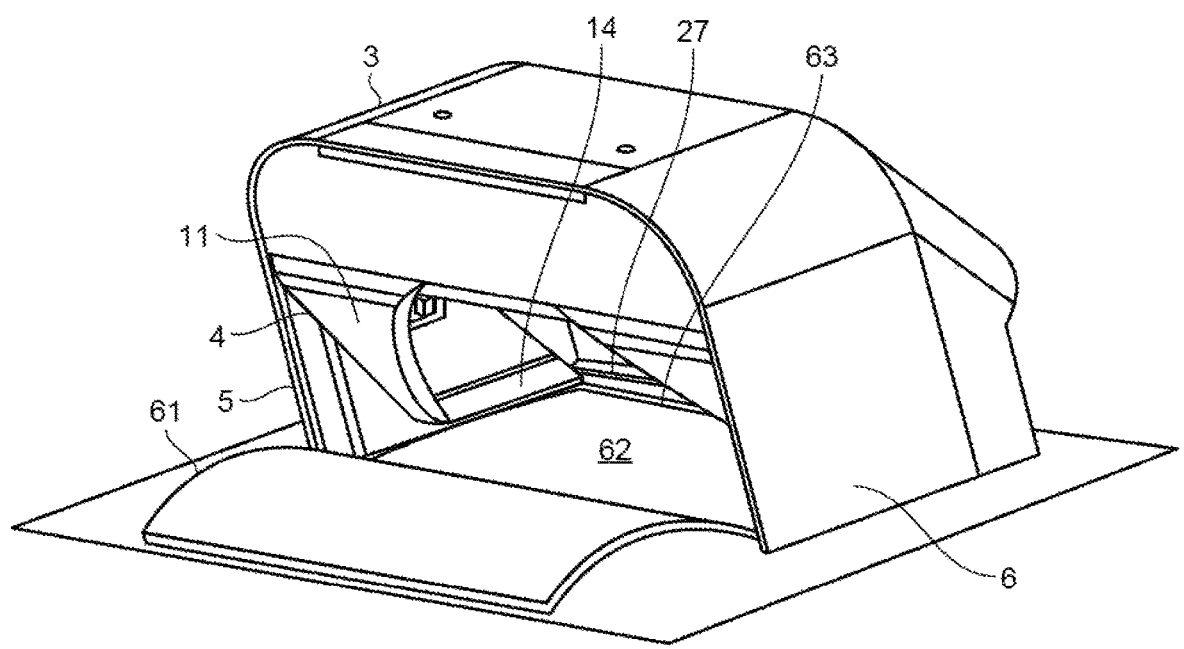
FIG. 18 is a perspective view illustrating a state where the booklet is placed at a predetermined position in the image reading apparatus according to the fifth embodiment.

To read the image of the page 62 of the booklet 61 by using the image reading apparatus according to the fifth embodiment, the user inserts the booklet 61 into the chassis 3 with the page 62 facing upward and the booklet back end 63 facing the back side, as illustrated in FIG. 18. FIG. 18 is a perspective view illustrating a state where the booklet 61 is placed at a predetermined position in the image reading apparatus according to the fifth embodiment. When the booklet 61 is inserted to the back side, the left end of the booklet 61 is held along the left side wall 5 and is sandwiched between the left holding member 14 and the installation surface where the image reading apparatus according to the fifth embodiment is installed. When the booklet 61 is inserted to the back side, the right end of the booklet 61 is held along the right side wall 6 and is sandwiched between the right holding member 15 and the installation surface. When the booklet back end 63 is brought into contact with the booklet contact member 27, it is guided by the booklet contact surface 28 and is pressed against the installation surface. In the image reading apparatus according to the fifth embodiment, in the same manner as the image reading apparatus 1 according to the first embodiment described above, the booklet 61 may be appropriately placed at a predetermined position, and the image of a predetermined area of the page 62 may be captured as appropriate.

Figure 19:
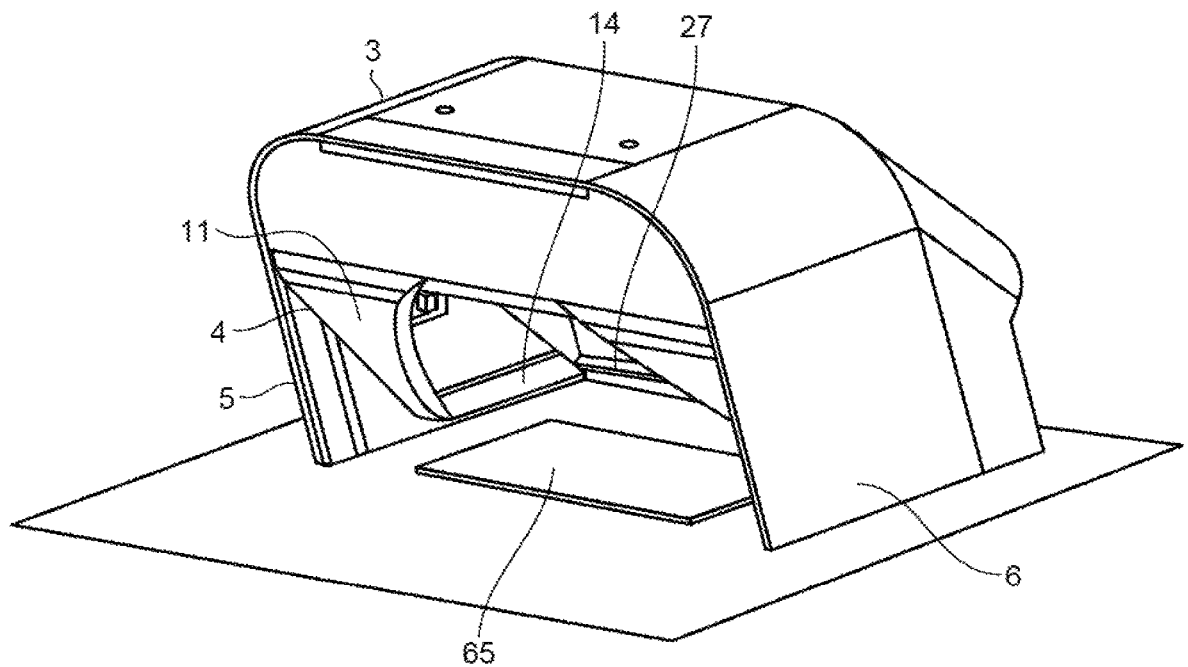
FIG. 19 is a perspective view illustrating a state where the card is placed at a predetermined position in the image reading apparatus according to the fifth embodiment.

To read the image of the card 65 by using the image reading apparatus according to the fifth embodiment, the user places the card 65 in the area between the portions of the installation surface opposed to the left holding member 14 and the right holding member 15, as illustrated in FIG. 19. FIG. 19 is a perspective view illustrating a state where the card 65 is placed at a predetermined position in the image reading apparatus according to the fifth embodiment. In the image reading apparatus according to the fifth embodiment, as the card 65 is thus placed on the installation surface, the image of the card 65 may be captured as appropriate in the same manner as the image reading apparatus 1 according to the above-described first embodiment.

Furthermore, although the booklet contact surface 28 is tilted in the image reading apparatus according to the above-described embodiment, the plane along the booklet contact surface 28 may be perpendicular to the plane along the booklet placement surface 31. In this case, too, the image reading apparatus makes it possible to place the booklet 61 at a predetermined position and to capture the image of the page 62 as appropriate.

Although the embodiments have been described above, the embodiments are not limited to the details described above. Furthermore, the above-described components include the one that may be easily conceived by those skilled in the art, substantially the identical one, and the one within what is called the range of equivalents. Furthermore, the above-described components may be combined as appropriate. Moreover, at least one of various omissions, substitutions, and modifications of the components may be made without departing from the gist of the embodiments.

The disclosed image reading apparatus may facilitate the user's operation of placing a medium at a predetermined position.

All examples and conditional language recited herein are intended for pedagogical purposes of aiding the reader in understanding the disclosure and the concepts contributed by the inventor to further the art, and are not to be construed as limitations to such specifically recited examples and conditions, nor does the organization of such examples in the specification relate to a showing of the superiority and inferiority of the disclosure. Although the embodiments of the disclosure have been described in detail, it should be understood that the various changes, substitutions, and alterations could be made hereto without departing from the spirit and scope of the disclosure.

What is claimed is:

1. An image reading apparatus comprising:
a first holding member that is provided with a first holding surface opposed to a placement surface;
a second holding member that is provided with a second holding surface opposed to the placement surface;
a guide member that is disposed on a front side of the first holding member and the second holding member; and
an imaging unit that is disposed so as to be opposed to the placement surface and capture a medium placed on the placement surface, wherein
the guide member is provided with a guide surface coupled to the first holding surface and the second holding surface and is disposed such that a distance from the placement surface to a first portion of the guide surface is smaller than a distance from the placement surface to a second portion of the guide surface disposed closer to the front side than the first portion.

2. The image reading apparatus according to claim 1, wherein the guide member is provided with an opening between a first guide surface portion of the guide surface coupled to the first holding surface and a second guide surface portion of the guide surface coupled to the second holding surface and is formed such that a width of the opening is smaller than a width of a gap formed between the first holding member and the second holding member.

3. The image reading apparatus according to claim 1, wherein the guide member is formed such that the guide surface extends along a curved surface that is convex toward the placement surface.

4. The image reading apparatus according to claim 1, wherein
the guide member is movable such that a space formed between the placement surface and the guide member expands or contracts, and
the image reading apparatus further comprises a biasing unit that moves the guide member to a predetermined position.

5. The image reading apparatus according to claim 1, further comprising a contact member that is provided with a contact surface opposed to an edge face of the medium on a back side opposite to the front side, wherein
the contact surface is formed such that a distance from the placement surface to a back contact surface portion of the contact surface is smaller than a distance from the placement surface to a front contact surface portion of the contact surface disposed closer to the front side than the back contact surface portion.

6. The image reading apparatus according to claim 1, further comprising a bottom member that is provided with the placement surface, wherein
the bottom member is provided with a recess between a portion of the placement surface opposed to the first holding surface and a portion of the placement surface opposed to the second holding surface to receive a different medium smaller than the medium.

7. The image reading apparatus according to claim 6, wherein the bottom member is provided with
a first contact surface that is opposed to an end of an edge face of the different medium on a back side opposite to the front side and on a side close to the first holding member;

a second contact surface that is opposed to an end of the edge face on a side close to the second holding member; and a cutout that is disposed between the first contact surface and the second contact surface.

8. The image reading apparatus according to claim 1, further comprising:

a bottom member that is provided with the placement surface; and a reader that reads information from a tag, wherein the reader is disposed inside the bottom member.

* * * * *